(12) United States Patent
Lindley et al.

(10) Patent No.: US 12,480,686 B2
(45) Date of Patent: Nov. 25, 2025

(54) ENCAPSULATED BUS CIRCUIT FOR FLUID HEATING SYSTEMS

(71) Applicant: WATLOW ELECTRIC MANUFACTURING COMPANY, St. Louis, MO (US)

(72) Inventors: Jacob R. Lindley, Webster Groves, MO (US); Mark D. Everly, St. Charles, MO (US); Michael A. Jones, St. Louis, MO (US); Dennis P. Long, Monroe City, MO (US); Scott H. Boehmer, Hannibal, MO (US); Philip S. Schmidt, Decorah, IA (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 1008 days.

(21) Appl. No.: 17/558,956

(22) Filed: Dec. 22, 2021

(65) Prior Publication Data

US 2022/0196283 A1 Jun. 23, 2022

Related U.S. Application Data

(60) Provisional application No. 63/130,084, filed on Dec. 23, 2020.

(51) Int. Cl.
*F24H 1/10* (2022.01)
*F24H 3/04* (2022.01)
(Continued)

(52) U.S. Cl.
CPC ........... *F24H 1/102* (2013.01); *F24H 3/0405* (2013.01); *F24H 9/1818* (2013.01);
(Continued)

(58) Field of Classification Search
None
See application file for complete search history.

(56) References Cited

U.S. PATENT DOCUMENTS 2,868,944 A * 1/1959 Koch ................... F24H 1/102
392/492
4,584,463 A * 4/1986 Klages ................. F24H 1/102
392/492
(Continued)

FOREIGN PATENT DOCUMENTS

EP 3216357 A1 9/2017
EP 3672366 A1 6/2020
(Continued)

OTHER PUBLICATIONS

International Search Report issued in corresponding International Application No. PCT/US2021/064829, mailed Apr. 11, 2022, 12 pages.
(Continued)

*Primary Examiner* — John J Norton
(74) *Attorney, Agent, or Firm* — Burris Law, PLLC

(57) ABSTRACT

A termination assembly for a heater assembly includes a plurality of resistive heaters arranged in discrete power phases, each resistive heater comprising a resistive heating element surrounded by dielectric material and a sheath. The termination assembly includes a plurality of electrically nonconductive members. Each electrically nonconductive member includes a plurality of apertures configured to receive power pins of the plurality of resistive heaters. The termination assembly includes a plurality of connectors configured to connect the power pins to the electrically nonconductive members. Each electrically nonconductive member includes a number of the plurality of connectors corresponding to a number of power pins being terminated. The termination assembly includes an electrical circuit embedded in or disposed on at least one of the plurality of electrically nonconductive members.

22 Claims, 6 Drawing Sheets

(51) Int. Cl.

| | | |
|---|---|---|
| *F24H 9/1818* | (2022.01) | |
| *F24H 9/1863* | (2022.01) | |
| *F24H 15/407* | (2022.01) | |
| *H01R 13/44* | (2006.01) | |
| *H05B 1/02* | (2006.01) | |
| *H05B 3/06* | (2006.01) | |
| *H05B 3/42* | (2006.01) | |

(52) U.S. Cl.
CPC ......... *F24H 9/1863* (2013.01); *F24H 15/407* (2022.01); *H01R 13/44* (2013.01); *H05B 1/0244* (2013.01); *H05B 3/06* (2013.01); *H05B 3/42* (2013.01); *H05B 2203/005* (2013.01); *H05B 2203/016* (2013.01)

(56) References Cited

U.S. PATENT DOCUMENTS

| | | | |
|---|---|---|---|
| 4,707,043 A * | 11/1987 | Reed | H01R 13/443 439/282 |
| 6,154,608 A | 11/2000 | Rochelle | |
| 6,289,177 B1 * | 9/2001 | Finger | H05B 3/06 392/455 |
| 7,372,007 B1 * | 5/2008 | McClanahan | H05B 3/44 219/628 |
| 8,731,386 B2 | 5/2014 | Waechter et al. | |
| 2017/0115072 A1 * | 4/2017 | Machalek | F28F 13/06 |
| 2019/0261461 A1 | 8/2019 | McDonnell et al. | |
| 2019/0289673 A1 | 9/2019 | Magnier | |
| 2020/0084838 A1 | 3/2020 | Antonopoulos et al. | |

FOREIGN PATENT DOCUMENTS

| | | |
|---|---|---|
| TW | 200526063 A | 8/2005 |
| TW | 200905114 A | 2/2009 |
| TW | 201733406 A | 9/2017 |
| TW | 201843553 A | 12/2018 |
| TW | 201935997 A | 9/2019 |
| TW | 201936070 A | 9/2019 |
| TW | 202033053 A | 9/2020 |
| WO | 2019141820 A1 | 7/2019 |
| WO | 2021087454 A1 | 5/2021 |

OTHER PUBLICATIONS

Search Report and office action issued in corresponding TW application No. 110148273, issued Dec. 5, 2022, 10 pages.

* cited by examiner

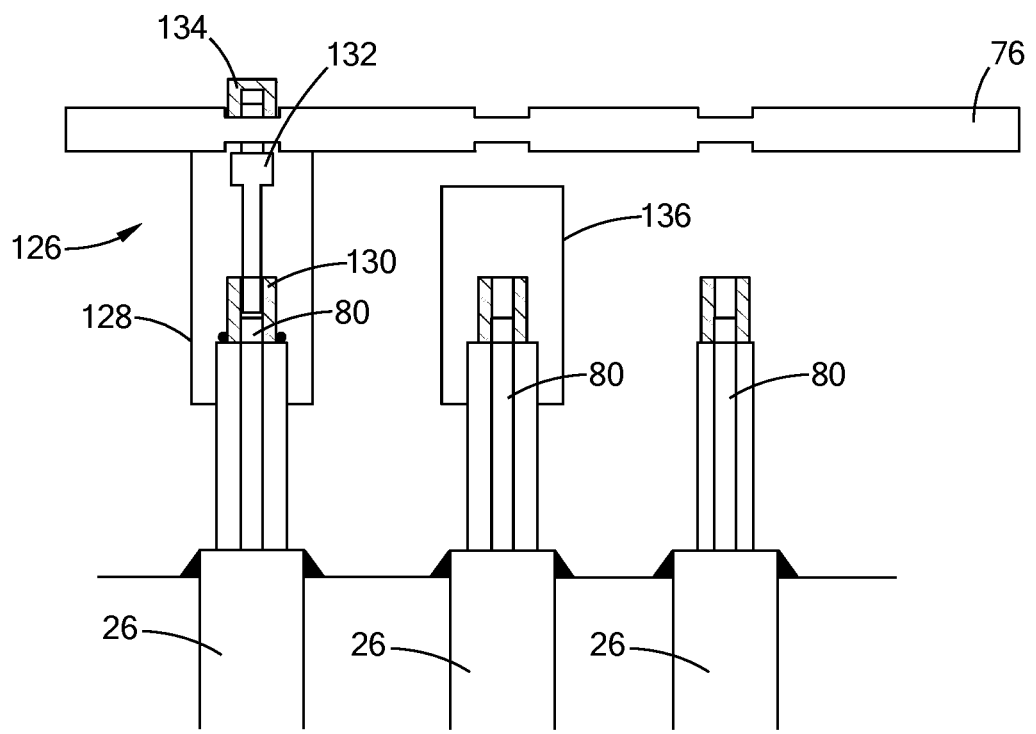
FIG. 6
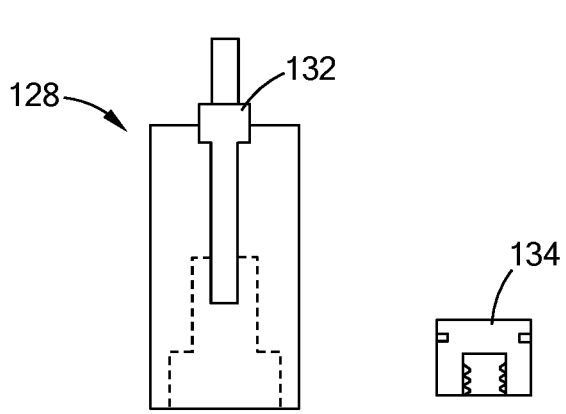
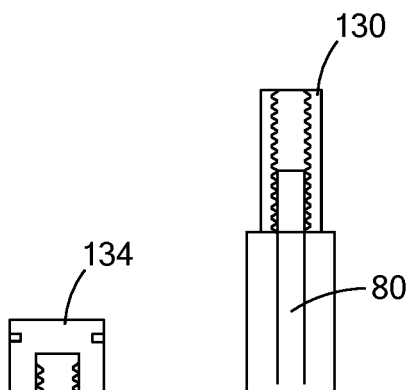
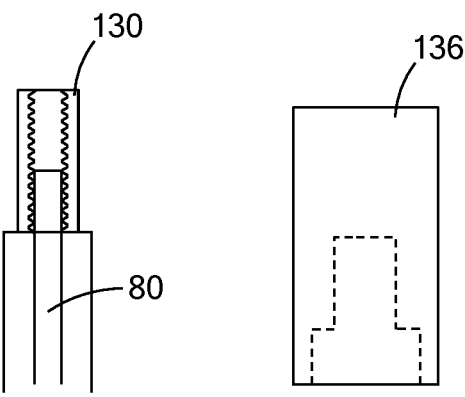
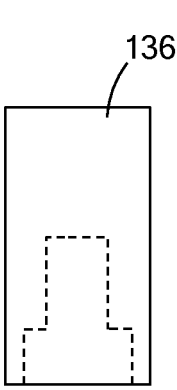
FIG. 6A     FIG. 6B     FIG. 6C     FIG. 6D

ENCAPSULATED BUS CIRCUIT FOR FLUID HEATING SYSTEMS

CROSS-REFERENCE TO RELATED APPLICATIONS

This application claims priority to and the benefit of U.S. Provisional Patent Application No. 63/130,084, filed Dec. 23, 2020. The disclosure of the above application is incorporated herein by reference in its entirety.

FIELD

The present disclosure relates to heat exchangers, and more specifically to heat exchangers having resistive heaters and electrical terminations for connecting the resistive heating elements to a power supply.

BACKGROUND

The statements in this section merely provide background information related to the present disclosure and may not constitute prior art.

Industrial electric heaters generally heat materials such as solids, liquids, or gasses with resistance heaters that convert electrical power to heat. In some applications, the resistance heaters are submerged in the liquid or gas, wherein the liquid or gas flows between the resistance heaters (e.g., heat exchangers). In some applications, a large amount of power is needed to bring the material to the desired temperature. For example, some applications require power greater than 1 megawatt, with some applications being in the range of 5 megawatts or greater. Typical low voltage electric heaters operate at around 700 volts but can require high electrical current (e.g., over 7,000 amps) to achieve the power required. The high current can require large and expensive power components, cables, and grounding strategies. Additionally, some industrial power sources require a step-down transformer to supply the low voltage.

The present disclosure addresses issues related to connecting the resistance heaters to a power supply in these industrial applications, including medium voltage heat exchanger applications, among other challenges with fluid heating vessels.

SUMMARY

This section provides a general summary of the disclosure and is not a comprehensive disclosure of its full scope or all of its features.

In one form, a termination assembly for a heater assembly having a plurality of resistive heaters arranged in discrete power phases, each resistive heater comprising a resistive heating element surrounded by dielectric material and a sheath, includes a plurality of electrically nonconductive members, each electrically nonconductive member including a plurality of apertures configured to receive power pins of the plurality of resistive heaters, a plurality of connectors configured to connect the power pins to the electrically nonconductive members, wherein each electrically nonconductive member includes a number of the plurality of connectors corresponding to a number of power pins being terminated, and an electrical circuit embedded in or disposed on at least one of the plurality of electrically nonconductive members.

In variations of this termination assembly, which may be implemented individually or in any combination: the plurality of electrically nonconductive members are spaced apart; the assembly further includes a dielectric encapsulant surrounding at least one of the power pins within at least one aperture; the dielectric encapsulant is partially removed proximate a distal end face of the electrically nonconductive member, and the termination assembly further includes an electrical connector secured to the distal end face and in electrical contact with a power pin; the assembly further includes an electrically conductive member disposed within at least one aperture of one of the electrically nonconductive members, the electrically conductive member being coupled to the power pin and to the electrical circuit; the assembly further includes an electrical isolator disposed around the electrically conductive member and in dielectrically sealing contact with the electrically nonconductive member; the assembly further includes an electrical isolator disposed within at least one aperture and surrounding a power pin; the assembly further includes at least one electrically insulating plug disposed within one of the apertures; the assembly further includes a spare element isolator disposed around a terminal end of at least one power pin; each electrically nonconductive member corresponds to one of the discrete power phases; at least one electrically nonconductive member corresponds to one of the discrete power phases; a plurality of the electrically nonconductive members corresponds to one of the discrete power phases; at least one of the electrically nonconductive members corresponds to a plurality of power phases; and the electrically nonconductive members are longitudinally arranged.

In another form, a heater assembly includes a plurality of resistive heaters arranged in discrete power phases, each resistive heater comprising a resistive heating element surrounded by dielectric material and a sheath, and a termination assembly including a plurality of electrically nonconductive members, each electrically nonconductive member comprising a plurality of apertures configured to receive power pins of the plurality of resistive heaters, a plurality of connectors configured to connect the power pins to the electrically nonconductive members, wherein each electrically nonconductive member comprises a number of the plurality of connectors corresponding to a number of power pins being terminated, and an electrical circuit embedded in or disposed on at least one of the plurality of electrically nonconductive members.

In variations of this heater assembly, which may be implemented individually or in any combination: the plurality of resistive heaters extends along a longitudinal axis of the heater assembly; and each electrically nonconductive member corresponds to one of the discrete power phases.

In yet another form of the present disclosure, a fluid heat exchanger comprises a tube including an inlet and an outlet, a plurality of resistive heaters arranged in discrete power phases and disposed within the tube, and a termination assembly including a plurality of electrically nonconductive members, each electrically nonconductive member comprising a plurality of apertures configured to receive power pins of the plurality of resistive heaters, a plurality of connectors configured to connect the power pins to the electrically nonconductive members, wherein each electrically nonconductive member comprises a number of the plurality of connectors corresponding to a number of power pins being terminated, and an electrical circuit embedded in or disposed on at least one of the plurality of electrically nonconductive members.

In variations of this fluid heat exchanger, which may be implemented individually or in any combination: the fluid heat exchanger operates under a medium voltage; the heat exchanger further includes a baffle disposed within the tube and extending along the plurality of resistive heaters; the baffle defines a helical shape; and each electrically nonconductive member corresponds to one of the discrete power phases.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 6-6D include further schematic illustrations of a variety of terminal connections constructed according to the teachings of the present disclosure.

Figure 1:
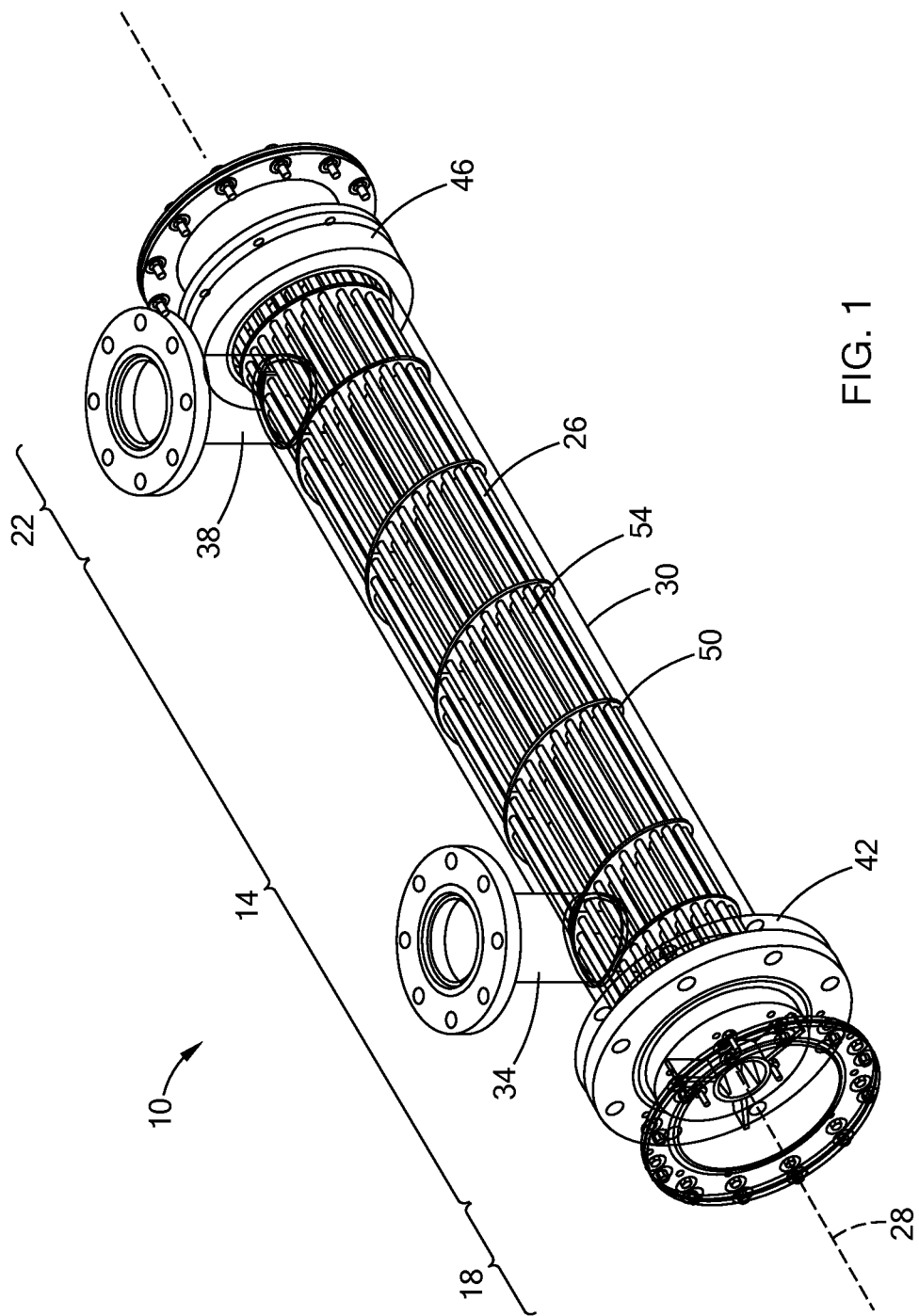
FIG. 1 is a perspective view of an electrical heater for use in a fluid heat exchanger and constructed according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
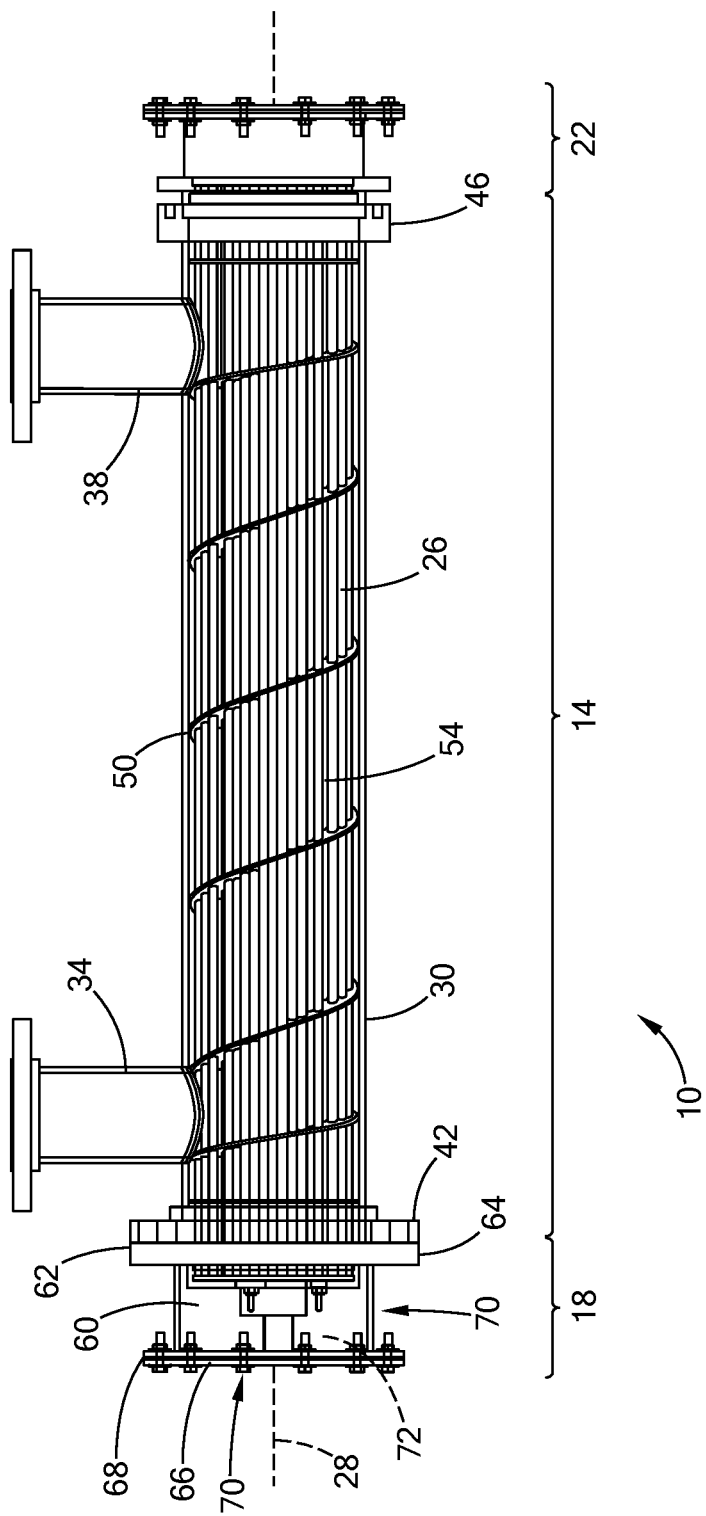
FIG. 2 is a side view of the electrical heater of FIG. 1.

Referring to FIGS. 1 and 2, an example electric heater 10 is illustrated. The electrical heater 10 includes a heating portion 14, a power supply portion 18, and a neutral terminal portion 22. The heating portion 14 includes a plurality of electrical resistive heaters 26 that extend parallel to a longitudinal axis 28 of the electrical heater 10 between the power supply portion 18 and the neutral terminal portion 22. In the example provided, each electrical resistive heater 26 includes a resistive heating element that is surrounded by a dielectric material and a sheath.

In the example provided, the electrical heater 10 is disposed within a tube 30 having a first port or inlet/outlet 34 proximate to the power supply portion 18 and a second port or inlet/outlet 38 proximate to the neutral terminal portion 22. The tube 30 is illustrated as transparent for clarity purposes to better illustrate the components within the tube 30. In the example provided, the tube 30 is metal and opaque, though other configurations can be used. Fluid can be pumped into the tube 30 via one of the inlet/outlets 34, 38 and it flows through the tube 30 in contact with respective sheaths of the resistive heaters 26 until it exits via the other inlet/outlet 34, 38. In the example provided, which is a fluid heat exchanger, the fluid flows in the first inlet/outlet 34 and out the second inlet/outlet 38, though the flow may be reversed. It should be understood that the term "fluid" is to be construed to include solids, liquids, gases, and plasmas, among other material states while remaining within the scope of the present disclosure.

The tube 30 includes a first shell flange 42 and a second shell flange 46. The first shell flange 42 is disposed between the power supply portion 18 and the first inlet/outlet 34 configured to couple the tube 30 to the power supply portion 18. The second shell flange 46 is disposed between the neutral terminal portion 22 and the second inlet/outlet 38 configured to couple the tube 30 to the neutral terminal portion 22.

A baffle 50 may also optionally be disposed within the tube 30. In the example provided, the baffle 50 is a continuous helical shape and directs the flow of the fluid along a helical flow pathway 54 between the two inlet/outlets 34, 38, though other configurations can be used. The baffle 50 can also act as a support member that supports the heaters 26 relative to each other and relative to the tube 30. In one configuration, the baffle 50 and tube 30 may be similar to those shown and described in U.S. Publication No. 2019/0063853, which is commonly owned with the present application and the entire disclosure of which is incorporated herein by reference. While illustrated and described with reference to heating a fluid flowing through the tube 30, the electric heater 10 may be used without the tube 30 in other applications such as submersion heating for example. Further optional construction details may be found in copending application Ser. No. 17/087,032 titled "Three Phase Medium Voltage Heater," filed on Nov. 2, 2020, U.S. Publication No. 2021/0136876, which is also commonly owned with the present application and the entire disclosure of which is incorporated herein by reference. As used herein, the term "medium voltage" should be construed to mean between about 2,000V and 20,000V. It should be understood, however, that the teachings of the present disclosure are not limited to medium voltage heaters.

In one form, the electrical heater 10 comprises an enclosure tube 60, tube sheet 62 having a flanged portion 64, and an end cap 66 and mating flange 68 secured together with mechanical fasteners 70. Accordingly, a terminal enclosure 72 is formed, which defines an internal cavity 74.

Figure 3:
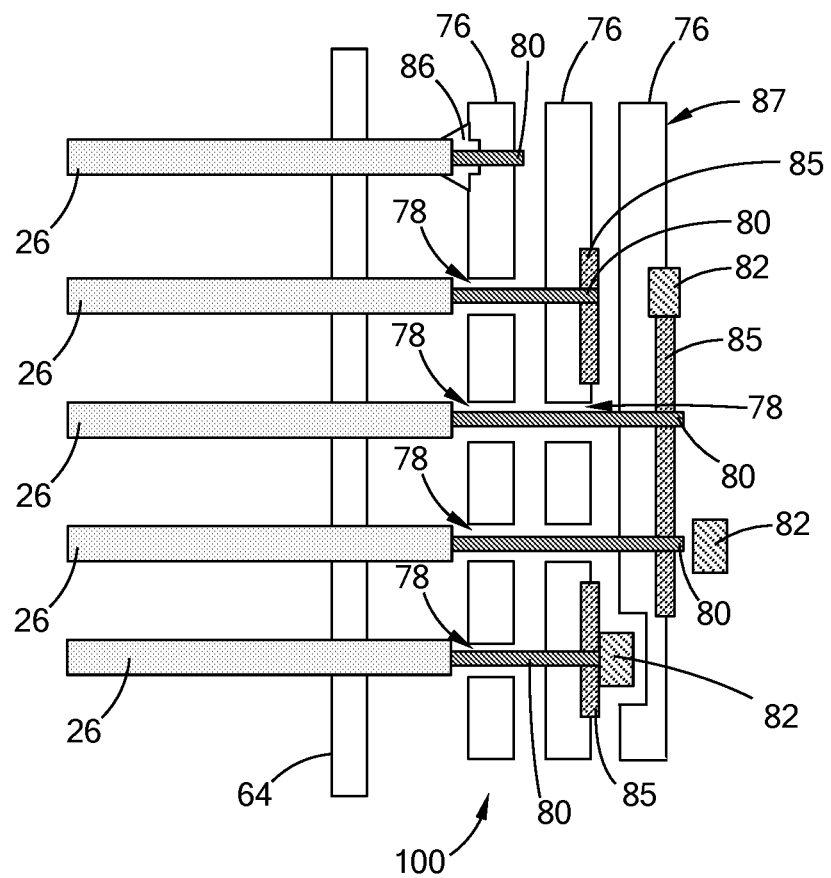
FIG. 3 is a schematic side view illustrating a termination assembly having bus plates constructed according to the teachings of the present disclosure.

Referring now to FIG. 3, within the internal cavity 74 of the terminal enclosure 72 as shown above, an innovative termination assembly is provided and generally indicated by reference numeral 100. The termination assembly 100 in one form comprises a plurality of longitudinally arranged electrically nonconductive members 76. These electrically nonconductive members 76 generally function as electrically bussing elements and are thus also referred to herein as "bus plates" or "layered bus plates." The term "member" as used in the context of this form is generally a plate or disc, or any suitable structure that functions as an electrically bussing element. The geometry may be flat or curved, and may further define a geometry that is round, square, rectangular, and polygonal, among other shapes. In the nonlimiting example of FIG. 3, three electrically nonconductive members 76 are shown as plates. In another nonlimiting form not shown in the figures, the electrically nonconductive members 76 have convex curved surfaces in a hemispherical shape.

As shown, each electrically nonconductive member 76 comprises a plurality of apertures 78 configured to receive power pins 80 of the plurality of resistive heaters 26. In one form, each electrically nonconductive member 76 corresponds to one of the discrete power phases. However, it should be understood that one electrically nonconductive member 76 may accommodate more than one of the discrete power phases, and more than one electrically nonconductive member 76 may correspond to one of the discrete power phases while remaining within the scope of the present disclosure.

As further shown, a plurality of connectors 82 are disposed on distal end faces 87 of the electrically nonconductive members 76, wherein each electrically nonconductive member 76 comprises a number of the plurality of connectors 82 corresponding to a number of power pins 80 being terminated. Advantageously, an electrical circuit 85 is embedded in at least one of a plurality of longitudinally arranged electrically conductive members 76. This electrical circuit is similar to a printed circuit board construction, wherein the electrical circuit provides electrical connections and controls for the electrical heater 10 during operation. The electrical circuit 85 may also be applied to (e.g., deposited, bonded) a distal end face 87 of the electrically nonconductive member 76 rather than being embedded while remaining within the scope of the present disclosure. One or more electrical circuits 85 may be used for each electrically nonconductive member 76. Further, the electrical circuit 85 may comprise multiple layers (FIGS. 4A and 4B) and/or be configured to reduce the deleterious effects of electrical fields by having shielding (not shown). These and other features of the electrical circuit 85 should be construed as being within the scope of the present disclosure.

In one form, the electrically nonconductive members 76 are longitudinally arranged and are spaced apart as shown. However, the electrically nonconductive members 76 could be joined together to form a composite assembly (not shown). In still another form, a single electrically nonconductive member 76 with either embedded bussing and/or bussing applied to any external face of the electrically nonconductive member 76 is contemplated by the teachings of the present disclosure.

As further shown in FIG. 3, a dielectric element 86 may be employed that reduces an electric field strength at the end of the resistive heater 26, wherein the power pin 80 exits the sheath as shown. In addition to the components illustrated in FIG. 3, a variety of mechanical and electrical connectors are described in greater detail below, which are configured to provide the requisite electrical connections while maintaining structural integrity, serviceability, and dielectric standoff, among other functional features, of the termination assembly 100. These various forms of mechanical and electrical connectors should not be construed as limiting the scope of the present disclosure.

Figure 4A:
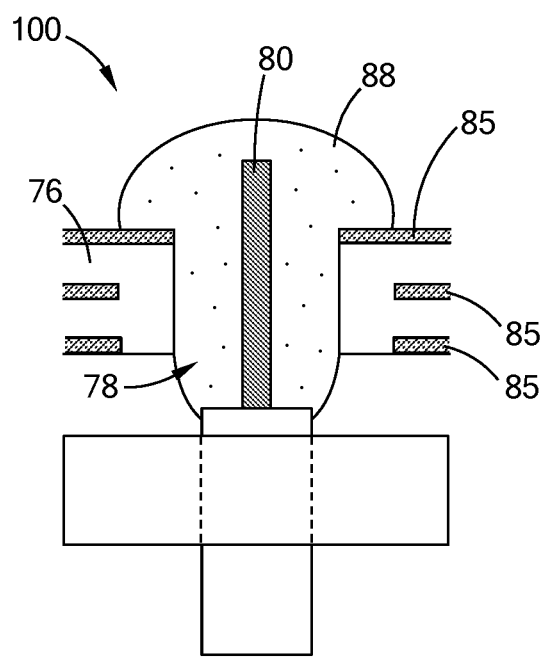
FIG. 4A is a schematic side view of one form of a terminal having a dielectric encapsulant constructed according to the teachings of the present disclosure.
Figure 4B:
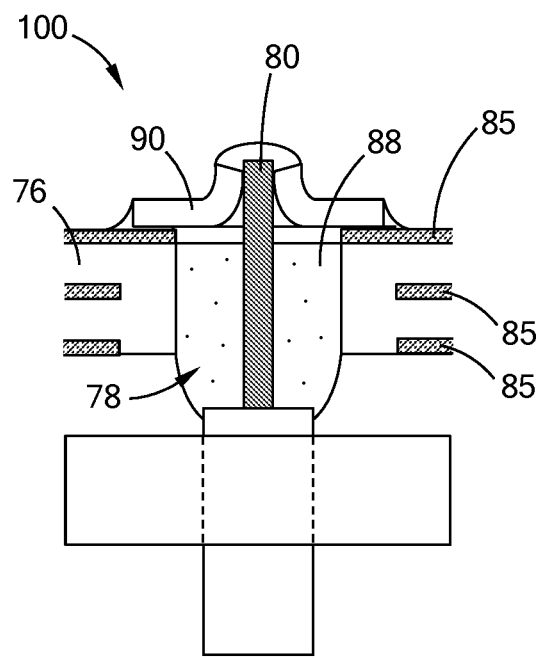
FIG. 4B is a schematic side view of the terminal of FIG. 4A having a portion of the dielectric encapsulant removed according to the teachings of the present disclosure.

Referring now to FIGS. 4A and 4B, the termination assembly 100 in one form includes an elastomeric dielectric encapsulant 88 surrounding the power pin 80 within an aperture 78 (FIG. 4A). This encapsulant 88 is initially used when the resistive heater 26 is not electrically connected, or is "out of circuit," as shown in FIG. 4A. When it is desired to electrically connect the resistive heater 26, a portion of the elastomeric dielectric encapsulant 88 is removed as shown in FIG. 4B, proximate a distal end face of the electrically nonconductive member 76. The termination assembly 100 thus further comprises an electrical connector 90 (in the form of an electrically conductive (e.g., copper) washer in this example) secured to the distal end face 85 of the electrically nonconductive member 76 and in electrical contact with a power pin 80 of the resistive heater 26.

Accordingly, an electrical connection can be made as desired, by removing a portion of the elastomeric dielectric encapsulant 88. It should be understood, however, that other forms of dielectric material may be employed for this variation and that the elastomeric encapsulant as shown is merely exemplary.

Figure 5:
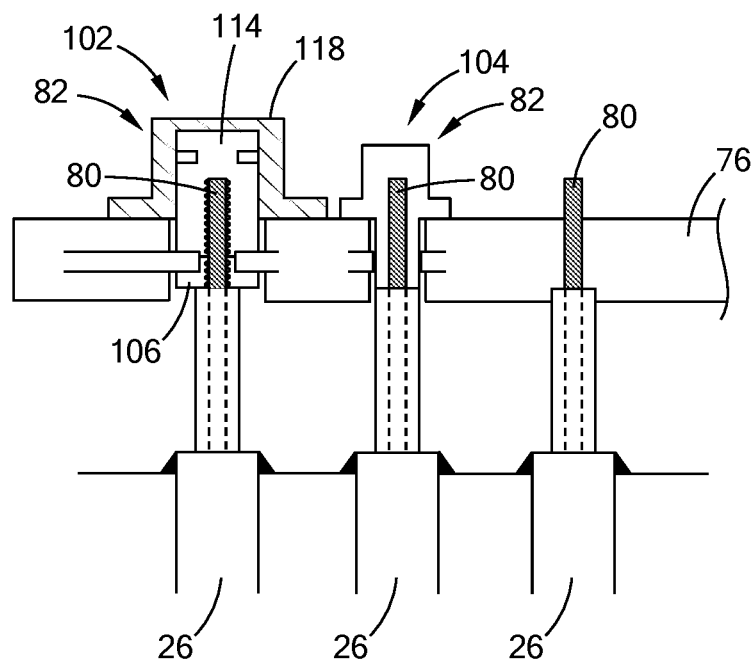
FIGS. 5-5D are schematic illustrations of a variety of terminal connections constructed according to the teachings of the present disclosure.

Referring now to FIGS. 5 and 5A-5D, one form of the mechanical/electrical connectors 82 from FIG. 3 is illustrated in greater detail. Specifically, FIG. 5 illustrates three resistive heaters 26, and two connectors 82: an isolator plug 102 for an active resistive heater 26 and an alternate isolator plug 104 for an inactive resistive heater 26. The isolator plug 102 connects the resistive heater 26 when connected to a power source. The alternate isolator plug 104 insulates the resistive heater when disconnected from the power source.

In one form shown in FIGS. 5 and 5A-5C, a connector base 106 of the isolator plug 102 is disposed at the end of a resistive heater 26 and around a power pin 80. The connector base 106 includes a lower flange 108 to locate the connector base 106 against the resistive heater 26, along with an extension 110 configured to make contact with the electrical circuit 85 within the electrically nonconductive member 76 ("bus plate") as shown. The connector base 106 may include a threaded inner bore 112 to secure the connector base 106 to the power pin 80 (which would be externally threaded in this form). A connector top 114 is then disposed over the power pin 80, which may also include a threaded bore 116 to receive the threaded power pin 80. A dielectric isolator 118 is then disposed over the connector top 114 as shown in FIG. 5, for an active resistive heater 26. The dielectric isolator 118 defines a cavity 120 therein configured to receive the connector top 114.

Figures 5A, 5B, 5C, 5D:
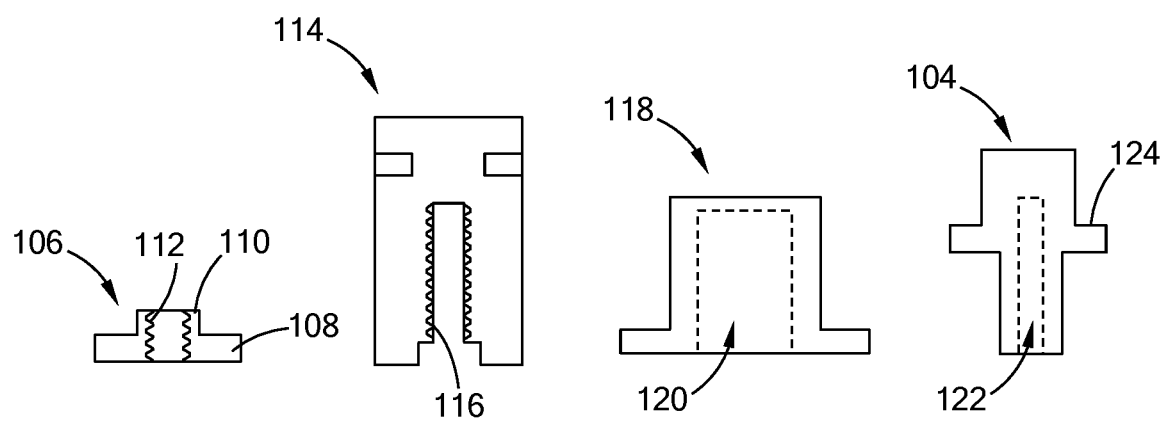

In the form of FIG. 5D, when the resistive heater 26 is not active, or is not connected to a power source, an alternate isolator plug 104 may be disposed within the aperture 78 and surround the power pin 80 ("cold pin" since the material low resistivity) in a cavity 122 defined therein. The isolator plug 104 includes a flange 124 to secure the isolator plug 104 to the distal end of the bus member 76. The isolator plug 104 is electrically insulating and is implemented as a "spare" and used for a "cold" pin 80, or a power pin 80 that is not electrically connected and receiving power. In one form, the isolator plug 104 is molded.

Referring now to FIGS. 6 and 6A-6D, another configuration for the mechanical/electrical connectors 82 from FIG. 3 is shown. In this form, a connector assembly 126 includes a main connector 128, which is a dielectric isolator. A variety of materials may be used for this main connector 128, and in one form, the material is compressible to fill any voids/gaps and to inhibit arcing. A socket connector 130 is disposed around the power pin 80 and within a central portion of the main connector 128 as shown. Further, a conductive adapter 132 is secured to the socket connector 130 and is configured for connection to the power source as shown. A removable terminal cap/plug 134 may be placed over the conductive adapter 132 until the electrical connection is ready to be made. As shown in FIG. 6D, an alternate form may employ a "spare" cap 136 (electrically insulating) that extends around the power pin 80 of the resistive heater 26 when the resistive heater 26 is not active.

Therefore, the present disclosure provides improved serviceability and reduced installation labor of heaters having termination connections such as those described herein. Further the present disclosure allows bussing circuits to be packed closely together and provides a means for mechanically supporting the circuits, which reduces the forces that might have been applied to the heaters during installation and service. Manufacturing processes for the present disclosure can allow different circuit designs to be configured without dedicated tooling, allowing more custom designs with less investment and shorter lead-times.

In summary, the present disclosure includes one or more bussing circuits that distributes electrical current among a plurality of resistive heaters used in, for example, a fluid heating vessel. The bussing circuits are attached to one or more support substrates and encapsulated by dielectric material, which may or may not be a different material than the substrate material. The circuit can be comprised of multiple layers separated by dielectric material in order to achieve sufficient cross-sectional area (i.e., dielectric strength) and the appropriate circuit heater connections. The assembly can include integrated connection features to facilitate the connection to the heater terminals and connection to the electrical power source.

The circuit material can be selected with the desired electrical, thermal, mechanical, and chemical properties. In most cases a highly conductive material such as copper would be used, but nickel, nickel alloys, aluminum, or others may be used in depending on application requirements.

The electrically nonconductive member 76 is electrically insulating, or dielectric, and provides mechanical structure to the circuit. The electrically nonconductive member 76 could be a polymer material such as polyimide, silicone, or Teflon®; it could be an epoxy material or fiber (glass or aramid) reinforced epoxy matrix; it could be ceramic material including engineered ceramics and glass, or it could be a composite material. The dielectric material that encapsulates and isolates the circuit can also be a polymer, epoxy, ceramic, or composite material. It can be applied through bonding, adhering, mechanical fasting, dipping, spraying, potting, among others.

The circuit can be manufacturing using traditional metal fabrication processes and then joined to the substrate; or the circuit can be deposited through additive manufacturing processes such as thermal spray, thick film, thin film, electroless plating, among others; or the circuit can be a manufactured from a foil/plate attached to the substrate that is then patterned using etching, ablation, or machining processes.

The options to connect the bus circuits connect to the heater cold pins include, by way of example, diffusion bonding, soldering, and mechanical fastening (threaded or push-on connectors, for example). Some of these options, including mechanical fastening and solder, have the advantage of being disassemble-able in a field repair scenario.

For medium voltage applications, the entirety of the electrical circuits and connections are encapsulated, or sealed, within or on the electrically nonconductive member(s) 76. The present disclosure may have recessed features or protruding tubes that engage/overlap insulation features (not shown) at the ends of the heater elements. These features could be (but not required to be) composed of the same polymer, ceramic, or epoxy material as the other dielectric features of the assembly.

Various forms of the present disclosure include:
PCB-style copper circuits on a circuit board substrate, encapsulated by a laminated sheet or potted insulation material;
Layered assembly of etched foil circuits sandwiched by sheets of polyimide or silicone rubber insulation;
Bus circuits that are fully encapsulated by potted/molded material where the dielectric material and the substrate material are one in the same; and
Circuits attached/deposited to a ceramic substrate and encapsulated by more of the same ceramic material (and bonded or pressed together) or encapsulated by a different material such as glass or polymer.

The present disclosure in one form includes at least three circuits to connect the resistive heaters 26 into a three-phase circuit. There may be additional circuits to connect resistive heaters 26 in parallel or in series as required by the application. In an extreme case, there would be n/2 circuits where n=the number of resistive heaters 26 in the assembly.

The assembly can include mounting holes for mechanically securing the assembly to a support structure. It can also contain one or more features for sensing and monitoring the system, including but not limited to temperature sensors, current sensors, shunt resistors, among others.

In some variations, the assembly may also contain a microprocessor and other integrated electronic components that enable control or monitoring of the heater bundle—such as temperature of the heater bundle, high-temperature limiting, power switching control, power/current/voltage limiting, among others. In this case, the assembly may contain communication inputs or outputs (analog, digital, or fieldbus).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A termination assembly for a heater assembly having a plurality of resistive heaters arranged in discrete power phases, each resistive heater comprising a resistive heating element surrounded by dielectric material and a sheath, the termination assembly comprising:
a plurality of electrically nonconductive members, each electrically nonconductive member comprising a plurality of apertures configured to receive power pins of the plurality of resistive heaters;
a plurality of connectors configured to connect the power pins to the electrically nonconductive members, wherein each electrically nonconductive member comprises a number of the plurality of connectors corresponding to a number of power pins being terminated; and
an electrical circuit embedded in or disposed on at least one of the plurality of electrically nonconductive members.

2. The termination assembly according to claim 1, wherein the plurality of electrically nonconductive members are spaced apart.

3. The termination assembly according to claim 1, further comprising a dielectric encapsulant surrounding at least one of the power pins within at least one aperture.

4. The termination assembly according to claim 3, wherein the dielectric encapsulant is partially removed proximate a distal end face of the electrically nonconductive member, and the termination assembly further comprises an electrical connector secured to the distal end face and in electrical contact with a power pin.

5. The termination assembly according to claim 1, further comprising an electrically conductive member disposed within at least one aperture of one of the electrically nonconductive members, the electrically conductive member being coupled to the power pin and to the electrical circuit.

6. The termination assembly according to claim 5, further comprising an electrical isolator disposed around the electrically conductive member and in dielectrically sealing contact with the electrically nonconductive member.

7. The termination assembly according to claim 1, further comprising an electrical isolator disposed within at least one aperture and surrounding a power pin.

8. The termination assembly according to claim 1, further comprising at least one electrically insulating plug disposed within one of the apertures.

9. The termination assembly according to claim 1, further comprising a spare element isolator disposed around a terminal end of at least one power pin.

10. The termination assembly according to claim 1, wherein each electrically nonconductive member corresponds to one of the discrete power phases.

11. The termination assembly according to claim 1, wherein at least one electrically nonconductive member corresponds to one of the discrete power phases.

12. The termination assembly according to claim 1, wherein a plurality of the electrically nonconductive members corresponds to one of the discrete power phases.

13. The termination assembly according to claim 1, wherein at least one of the electrically nonconductive members corresponds to a plurality of power phases.

14. The termination assembly according to claim 1, wherein the electrically nonconductive members are longitudinally arranged.

15. A heater assembly comprising:
a plurality of resistive heaters arranged in discrete power phases, each resistive heater comprising a resistive heating element surrounded by dielectric material and a sheath; and
a termination assembly comprising:
a plurality of electrically nonconductive members, each electrically nonconductive member comprising a plurality of apertures configured to receive power pins of the plurality of resistive heaters;
a plurality of connectors configured to connect the power pins to the electrically nonconductive members, wherein each electrically nonconductive member comprises a number of the plurality of connectors corresponding to a number of power pins being terminated; and
an electrical circuit embedded in or disposed on at least one of the plurality of electrically nonconductive members.

16. The heater assembly according to claim 15, wherein the plurality of resistive heaters extends along a longitudinal axis of the heater assembly.

17. The heater assembly according to claim 15, wherein each electrically nonconductive member corresponds to one of the discrete power phases.

18. A fluid heat exchanger comprising:
a tube including an inlet and an outlet;
a plurality of resistive heaters arranged in discrete power phases and disposed within the tube; and
a termination assembly comprising:
a plurality of electrically nonconductive members, each electrically nonconductive member comprising a plurality of apertures configured to receive power pins of the plurality of resistive heaters;
a plurality of connectors configured to connect the power pins to the electrically nonconductive members, wherein each electrically nonconductive member comprises a number of the plurality of connectors corresponding to a number of power pins being terminated; and
an electrical circuit embedded in or disposed on at least one of the plurality of electrically nonconductive members.

19. The fluid heat exchanger according to claim 18, wherein the fluid heat exchanger operates under a medium voltage.

20. The fluid heat exchanger according to claim 18, further comprising a baffle disposed within the tube and extending along the plurality of resistive heaters.

21. The fluid heat exchanger according to claim 20, wherein the baffle defines a helical shape.

22. The fluid heat exchanger according to claim 18, wherein each electrically nonconductive member corresponds to one of the discrete power phases.

* * * * *